(12) United States Patent
Kim

(10) Patent No.: US 7,401,768 B2
(45) Date of Patent: Jul. 22, 2008

(54) HUMIDIFICATION DEVICE FOR FUEL BATTERY SYSTEM

(75) Inventor: Hyun-Yoo Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 344 days.

(21) Appl. No.: 11/304,941

(22) Filed: Dec. 14, 2005

(65) Prior Publication Data

US 2007/0096348 A1    May 3, 2007

(30) Foreign Application Priority Data

Nov. 2, 2005    (KR) ...................... 10-2005-0104250

(51) Int. Cl.
*B01F 3/04* (2006.01)
(52) U.S. Cl. .................. 261/142; 261/102; 261/104
(58) Field of Classification Search ................ 261/102, 261/104, 105, 107, 142, 154
See application file for complete search history.

(56) References Cited

U.S. PATENT DOCUMENTS

| | | | |
|---|---|---|---|
| 6,554,261 B2 * | 4/2003 | Katagiri et al. | ............. 261/154 |
| 6,653,012 B2 | 11/2003 | Suzuki et al. | |
| 6,659,433 B2 * | 12/2003 | Kusano et al. | ............... 261/102 |
| 6,669,177 B2 * | 12/2003 | Shimanuki et al. | ............. 261/96 |
| 6,755,399 B2 * | 6/2004 | Shimanuki et al. | ........... 261/104 |
| 6,805,988 B2 * | 10/2004 | Shimanuki et al. | ............. 429/34 |
| 2001/0015500 A1 * | 8/2001 | Shimanuki et al. | ........... 261/104 |
| 2001/0015501 A1 * | 8/2001 | Katagiri et al. | ............. 261/104 |
| 2002/0024155 A1 * | 2/2002 | Kusano et al. | ............... 261/104 |
| 2005/0110172 A1 * | 5/2005 | Tanaka et al. | ............... 261/104 |
| 2005/0116365 A1 * | 6/2005 | Yazawa | ....................... 261/104 |
| 2005/0121812 A1 * | 6/2005 | Okada | ......................... 261/104 |

FOREIGN PATENT DOCUMENTS

| | | |
|---|---|---|
| JP | 2001-202978 | 7/2001 |
| JP | 2002-292233 | 10/2002 |
| JP | 2003-178781 | 6/2003 |

* cited by examiner

*Primary Examiner*—Scott Bushey
(74) *Attorney, Agent, or Firm*—Morgan Lewis & Bockius LLP

(57) ABSTRACT

A humidification device for a fuel battery system, which rapidly exchanges dry air with humid air over a wide area, thus increasing humidification efficiency, and which appropriately heats dry air and humid air during cold weather, thus preventing the moisture of humid air from freezing, therefore being effectively used in cold regions. The humidification device includes a hollow fiber membrane to pass dry air and humid air so that moisture exchange is conducted between the dry air and the humid air, and a dry air guide pipe to supply new dry air into the hollow fiber membrane.

3 Claims, 2 Drawing Sheets

HUMIDIFICATION DEVICE FOR FUEL BATTERY SYSTEM

CROSS-REFERENCE TO RELATED APPLICATIONS

The present application is based on, and claims priority from, Korean Application Serial Number 10-2005-0104250, filed on Nov. 2, 2005, the disclosure of which is hereby incorporated by reference herein in its entirety.

FIELD OF THE INVENTION

The present invention relates, in general, to a fuel battery system and, more particularly, to a humidification device for a fuel battery system, which uses a spiral dry air guide pipe having a hot wire therein, thus increasing humidification efficiency.

BACKGROUND OF THE INVENTION

A fuel battery system used as a power source for an electric car needs humidified air to promote a chemical reaction. The fuel battery system uses a humidification device to transfer the moisture from off gas which is humid gas discharged from a fuel battery to dry air.

A humidification device which has low power consumption and requires a small mounting space is preferable. Generally, a humidification device using a hollow fiber membrane is used in the fuel battery system.

SUMMARY OF THE INVENTION

Embodiments of the present invention provide a humidification device for a fuel battery system, which rapidly exchanges dry air with humid air over a wide area, thus increasing humidification efficiency, and which appropriately heats dry air and humid air during cold weather, thus preventing the moisture of humid air from freezing, therefore being effectively used in cold regions.

A humidification device for a fuel battery system according to an embodiment of the present invention includes a hollow fiber membrane to pass dry air and humid air so that moisture exchange is conducted between the dry air and the humid air, and a dry air guide pipe to supply new dry air into the hollow fiber membrane.

Preferably, the humidification device further includes a heating means to heat the dry air and the humid air fed into the hollow fiber membrane.

Further, the dry air guide pipe includes a plurality of circles partially overlapping each other and arranged in a longitudinal direction of the hollow fiber membrane. A plurality of outlet holes is formed in the dry air guide pipe in a longitudinal direction thereof, and sprays the dry air.

Further, the dry air guide pipe is a double pipe structure having an inner pipe and an outer pipe, and the heating means includes a hot wire embedded between the inner and outer pipes.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, the preferred embodiment of the present invention will be described in detail with reference to the accompanying drawings.

Figure 1:
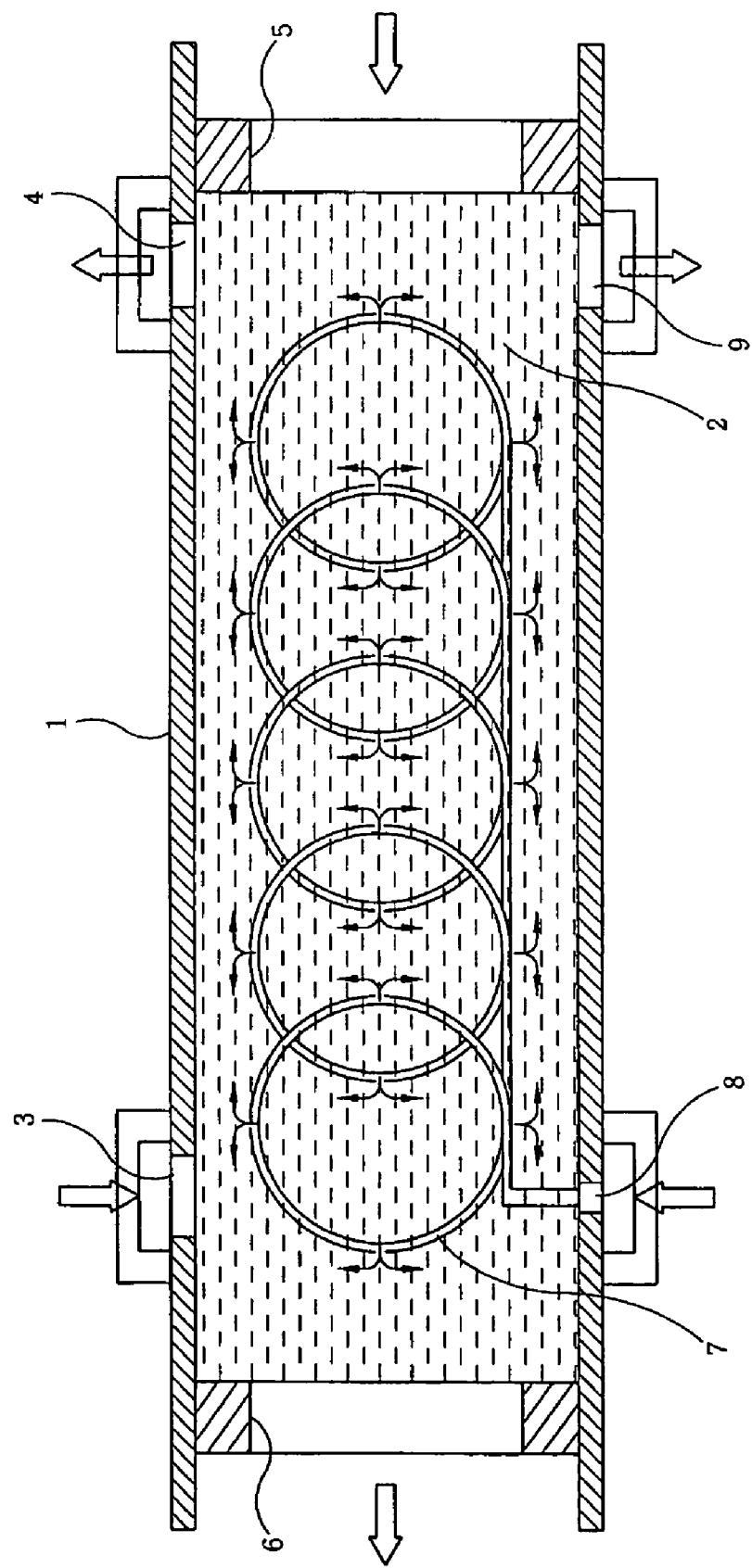
FIG. 1 is a sectional view of a humidification device for a fuel battery system, according to the present invention.

FIG. 1 shows the cross-section of a humidification device for a fuel battery system, according to the present invention. In a detailed description, a plurality of hollow fiber membranes 2 is received in a housing 1. A first inlet port 3 and a first outlet port 4 are provided in the housing 1. Dry air is fed through the first inlet port 3 into the housing 1, and is discharged through the first outlet port 4 out of the housing 1.

Further, a humid air inlet port 5 and a humid air outlet port 6 are provided in the housing 1 in such a way as to be perpendicular to the first inlet and outlet ports 3 and 4 and be parallel to the hollow fiber membranes 2. Humid air is fed through the humid air inlet port 5 into the housing 1, and is discharged through the humid air outlet port 6 out of the humid air outlet port 6.

When humid air is fed through the humid air inlet port 5 into the housing 1, the humid air passes through the hollow fiber membranes 2, and thereafter is discharged through the humid air outlet port 6 out of the housing 1. Moisture laden in the humid air is separated from the humid air through the capillary action of the hollow fiber membranes 2. The separated moisture is condensed while passing through capillary tubes of the hollow fiber membranes 2, prior to flowing to the outer portion of the hollow fiber membranes 2.

Meanwhile, when dry air is fed through the first inlet port 3 into the housing 1, the dry air flows to the outer portion of the hollow fiber membranes 2. At this time, the dry air is humidified by the moisture separated from the humid air, and thereafter is discharged through the first outlet port 4 out of the housing 1.

A dry air guide pipe 7 is installed in the hollow fiber membranes 2 which are received in the housing 1. The dry air guide pipe 7 comprises a plurality of circles which partially overlap each other. An inlet of the dry air guide pipe 7 is coupled to a second dry air inlet port 8, which is provided in the housing 1 in such a way as to be opposite the first inlet port 3. An outlet of the dry air guide pipe 7 is arranged to face a second dry air outlet port 9, which is provided in the housing 1 in such a way as to be opposite the first outlet port 4.

Figure 2:
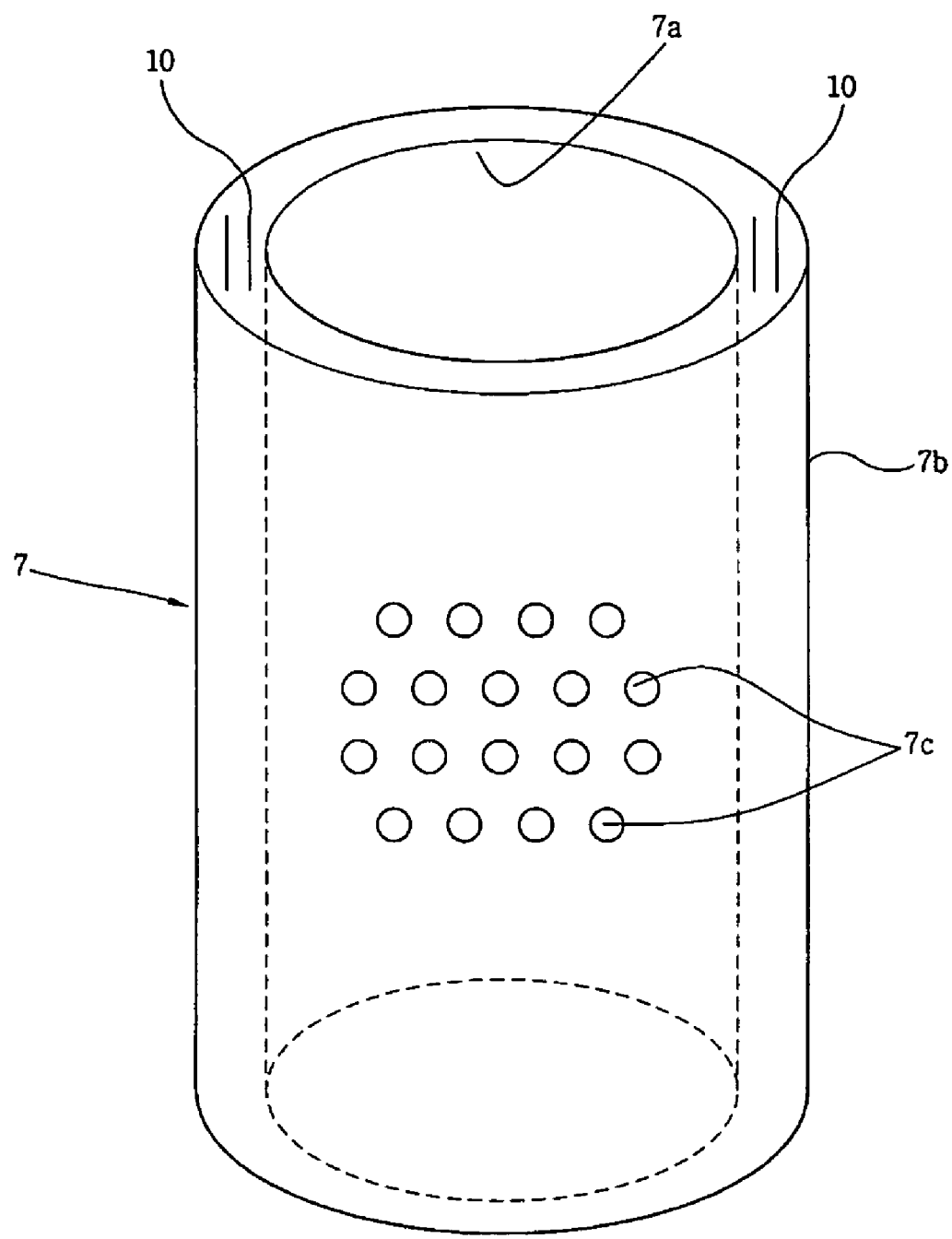
FIG. 2 is a partial cutaway perspective view of a dry air guide pipe, according to the present invention.

As shown in FIG. 2, the dry air guide pipe 7 is a double pipe structure having an inner pipe 7a and an outer pipe 7b. A hot wire 10 is disposed between the inner and outer pipes 7a and 7b, and generates heat when electricity is supplied to the hot wire 10, thus heating the air guide pipe 7. A plurality of outlet holes 7c is formed in several portions of the dry air guide pipe 7 in a lengthwise direction thereof.

When dry air is fed through the second inlet port 8 into the dry air guide pipe 7, the dry air flows along the dry air guide pipe 7. While the dry air is flowing, the dry air is discharged through the outlet holes 7c out of the dry air guide pipe 7. The dry air discharged through the outlet holes 7c is evenly sprayed out of the hollow fiber membranes 2 in the housing 1. Thereby, the efficiency of humidification of the dry air is increased.

Since the dry air is rapidly sprayed out of the hollow fiber membranes 2 through the outlet holes 7c, the speed of moisture exchange is increased, and the humidification efficiency is increased. Most of the dry air supplied through the dry air guide pipe 7 is discharged through the second outlet port 9 out of the housing 1. The rest of the dry air is mixed with dry air fed through the first inlet port 3, so that the mixture is discharged through the first outlet port 4 out of the housing 1.

Further, when it is cold, electricity is supplied to the hot wire 10. At this time, the dry air guide pipe 7 is heated by the hot wire 10, thus preventing moisture flowing out of the hollow fiber membranes from freezing, therefore effectively humidifying dry air.

As apparent from the foregoing, the present invention provides a humidification device for a fuel battery system, which is constructed so that dry air is sprayed through a dry air guide pipe installed in hollow fiber membranes, thus allowing the dry air to be evenly sprayed on the outer portion of the hollow fiber membranes in a housing, therefore increasing humidification efficiency of the dry air. Further, the humidification device increases the speed at which dry air is sprayed, thus increasing the speed at which dry air is exchanged with humid air. When it is cold, a hot wire embedded in the dry air guide pipe heats dry air and humid air, thus preventing the moisture of humid air from freezing, therefore increasing humidification efficiency of the dry air.

What is claimed is:

1. A humidification device for a fuel battery system, comprising:

a hollow fiber membrane to pass dry air and humid air so that moisture exchange is conducted between the dry air and the humid air;

a dry air guide pipe to supply new dry air into the hollow fiber membrane, wherein said dry air guide pipe comprises a plurality of circles partially overlapping each other, and arranged in a longitudinal direction of the hollow fiber membrane; and a plurality of outlet holes formed in the dry air guide pipe in a longitudinal direction thereof, and spraying the dry air; and heating means to heat the dry air and the humid air fed into the hollow fiber membrane.

2. The humidification device as defined in claim 1, wherein said dry air guide pipe is a double pipe structure having an inner pipe and an outer pipe, and the heating means comprises a hot wire embedded between the inner and outer pipes.

3. The humidification device as defined in claim 2, wherein said hollow fiber membrane is received in a housing, and the housing comprises first and second dry air inlet ports, first and second dry air outlet ports, and humid air inlet and outlet ports which are arranged to be perpendicular to the first and second dry air inlet ports and the first and second dry air outlet ports.

* * * * *